Figure 1:
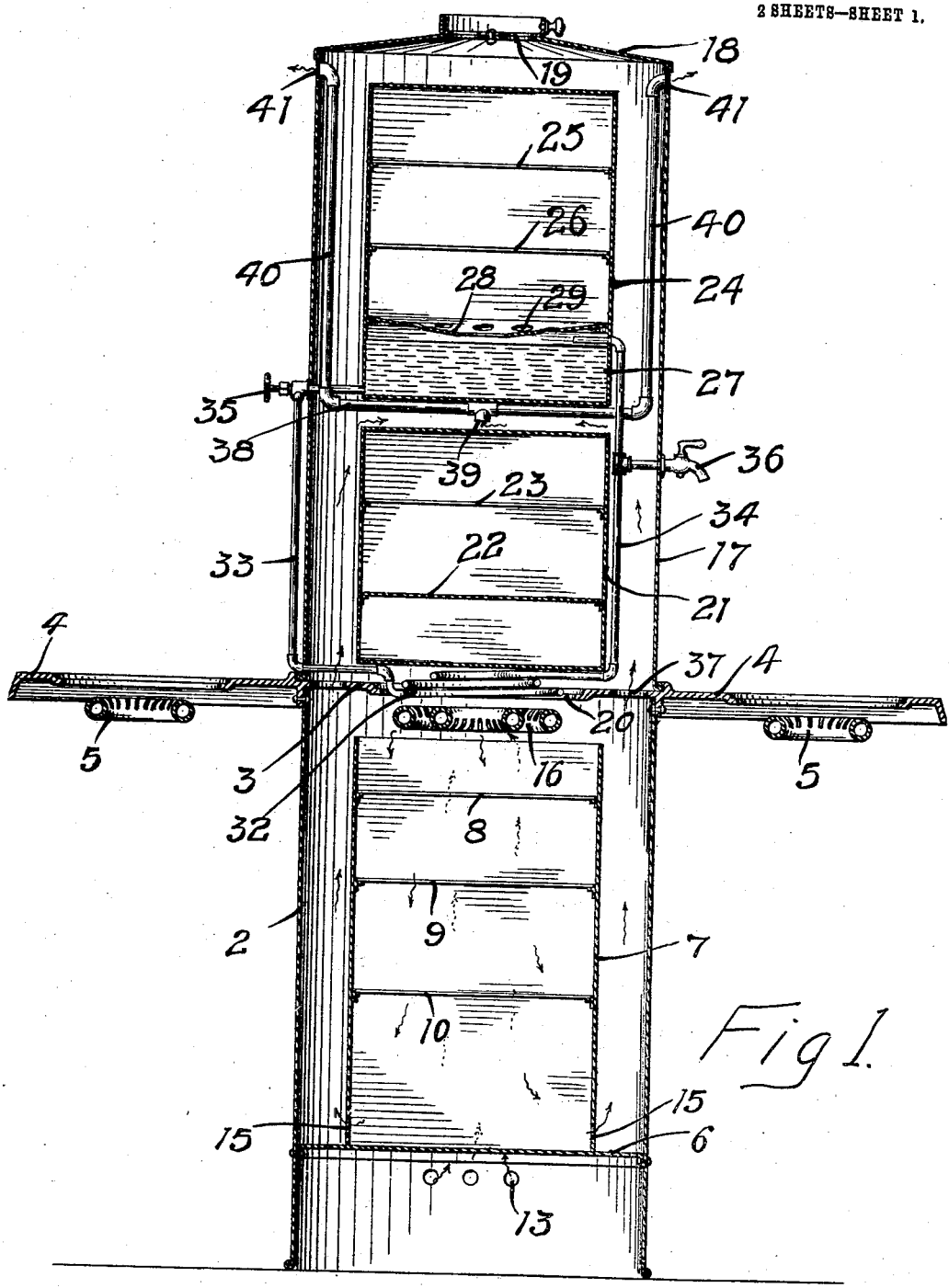

H. B. CORNISH.
COMBINED GAS RANGE AND COOKER.
APPLICATION FILED JAN. 2, 1908.

917,848.

Patented Apr. 13, 1909.
2 SHEETS—SHEET 1.

WITNESSES

INVENTOR
HARRY B. CORNISH
BY Paul & Paul
HIS ATTORNEYS

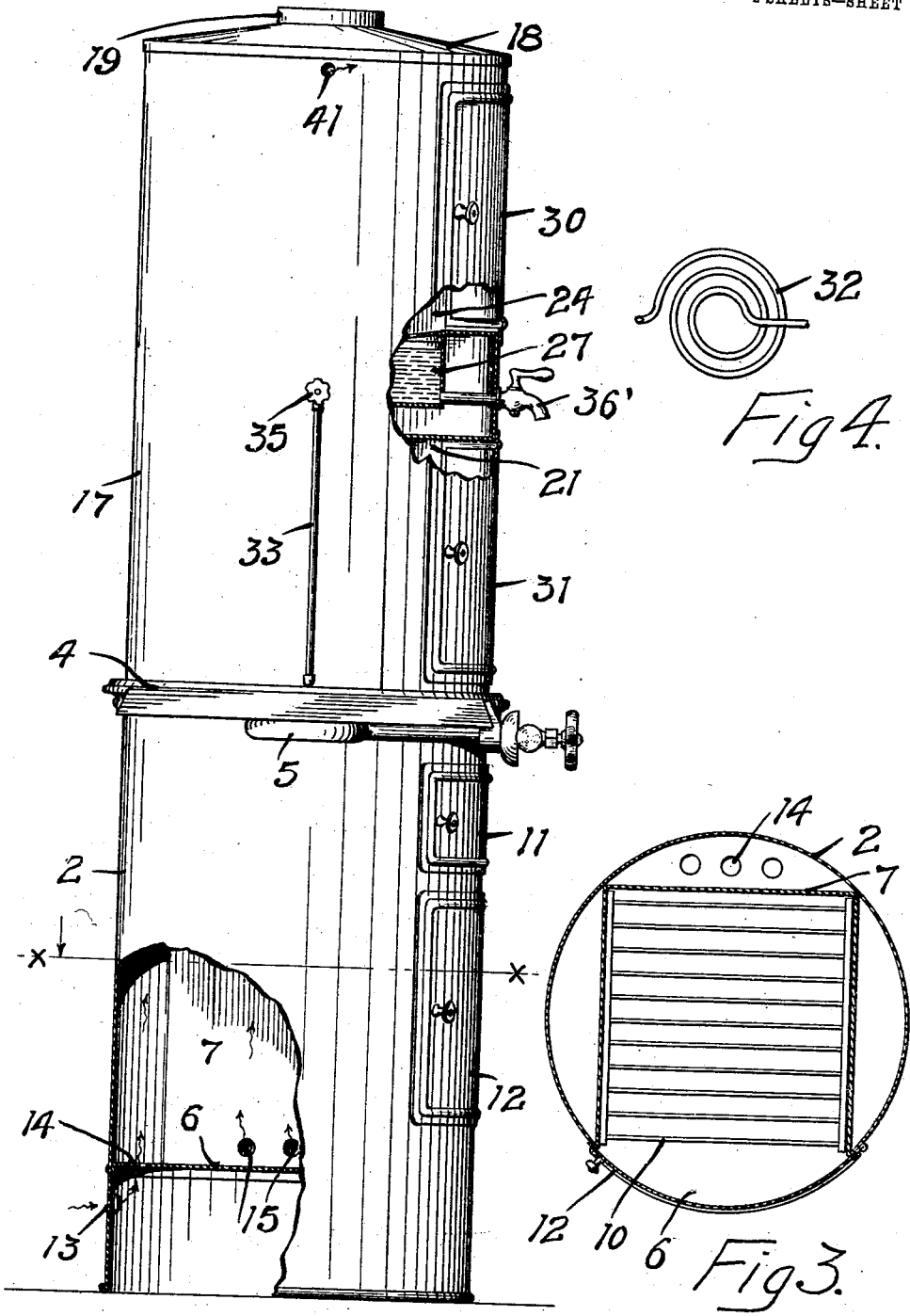

UNITED STATES PATENT OFFICE.

HARRY B. CORNISH, OF MINNEAPOLIS, MINNESOTA, ASSIGNOR, BY DIRECT AND MESNE ASSIGNMENTS, OF ONE-HALF TO P. G. REITER, OF MINNEAPOLIS, MINNESOTA.

COMBINED GAS RANGE AND COOKER.

No. 917,848.        Specification of Letters Patent.        Patented April 13, 1909.

Application filed January 2, 1908. Serial No. 409,072.

*To all whom it may concern:*

Be it known that I, HARRY B. CORNISH, of Minneapolis, Hennepin county, Minnesota, have invented certain new and useful Improvements in a Combined Gas Range and Cooker, of which the following is a specification.

The object of my invention is to provide a range and cooker in which food may be steamed, baked or broiled by means of one burner and the consumption of a comparatively small amount of gas.

A further object is to provide a range and cooker which is simple and compact in construction and easily accessible for cleansing purposes.

Other objects of the invention will appear from the following detailed description.

The invention consists generally in various constructions and combinations, all as hereinafter described and particularly pointed out in the claims.

In the accompanying drawings, forming part of this specification, Figure 1 is a vertical sectional view of a combined range and cooker embodying my invention. Fig. 2 is a side elevation of the same, a portion of the wall being broken away. Fig. 3 is a sectional view on the line $x$—$x$ of Fig. 2. Fig. 4 is a detail view of the hot water coil located above the burner.

In the drawing, 2 represents the base of the range having a top 3 and shelves 4 on each side forming continuations of the top and provided with burners 5. A floor 6 is provided within the base 2 whereon the broiling oven 7 is mounted, said oven containing a series of shelves 8, 9 and 10, accessible through the doors 11 and 12. The walls of the broiling oven are separated from the outer walls of the range, as indicated in Figs. 1 and 3, and a series of air intake holes 13 are provided in the lower walls of the range to admit air into the space beneath the floor 6, and holes 14 are provided in said floor leading into the space between the broiling oven and the range walls, and a series of holes 15 are provided in the lower walls of the broiling oven communicating with the space around the said oven. A circulation is thus maintained up around the broiling oven and downwardly therein through the holes 15.

A burner 16 is located directly over the open top of the broiling oven and above the shelf 8 which serves as the broiler, being located sufficiently near the burner for that purpose. Above the burner and resting on the top 3 is a cooker having a wall 17 that coincides preferably with the wall of the base 2. This cooker has a top 18 provided with a register 19.

An opening 20 is provided in the top 3 over the burner 16 and a baking oven 21 having shelves 22 and 23 therein is arranged over the opening 3.

Above the baking oven in the top of the cooker is a steaming oven 24 having shelves 25 and 26 therein and a water tank 27 in its lower portion provided with a cover 28 having a series of holes 29 therein. This cover is accessible through the door 30 and may be removed when it is desired to clean out the water tank.

A door 31 is provided in the lower portion of the cooker through which access may be had to the baking oven.

A hot water coil 32 is provided in the opening 20 with pipes 33 and 34 leading vertically therefrom, the former on the outside of the cooker casing and the latter on the inside thereof, one extending into the lower portion of the water tank and the other into the upper portion. The pipe 33 has a needle valve 35 by means of which the flow of water from the tank may be closely regulated. A faucet 36 is connected to the pipe 34 so that whenever desired hot water may be obtained from the coil without the necessity of heating all the water in the tank. A faucet 36' is provided in the lower portion of the water tank. The coil over the burner has a large heating surface and by means of the needle valve 35 a small amount of water may be admitted into the coil and heated very quickly. The coil will also aid in heating the contents of the baking oven.

The top 3 is provided with holes 37 through which air from the range beneath is allowed to flow up into the cooker and around the baking oven. Between the baking oven and the steamer I provide a horizontal pipe 38 having an intake opening 39 in the space between the steamer and baking oven, and vertical pipes 40 are connected to the ends of the pipe 38 and extend up beside the steamer and have discharge openings 41 in the upper walls of the steamer. I am thus able by closing the register 19 to draw the heated air in between the baking oven and the steamer and cause it to flow into the opening 39 and up through the pipes 40 to the discharge opening.

This cooker may be removably mounted on the range or may be permanently attached thereto, as desired.

I claim as my invention:

1. The combination, with a gas range having a burner and a top provided with an opening over said burner, of a cooker adapted to rest upon said top over said opening, a steaming oven provided within said cooker and having a water tank and a draw-off faucet, a coil provided in said opening over said burner, supply and return pipes leading therefrom to said water tank, a valve provided in the supply pipe from said tank to said coil, and a faucet provided in the hot water return pipe from said coil to said tank, whereby a supply of hot water may be obtained directly from said coil, substantially as described.

2. The combination, with a range having a burner and a top above said burner provided with ports for the passage of air, a cooker adapted to rest on said top, baking and steaming ovens provided in said cooker and spaced from the walls thereof, and the upper portion of said baking oven being spaced from the lower portion of said steaming oven, a horizontal pipe provided within the space between said ovens and having a central intake opening and pipes communicating with said horizontal pipe and extending vertically in the space between said ovens and the walls of said cooker and having discharge openings at their upper ends through the wall of said cooker, and said cooker having a closable top and the air passing up through the openings in said range top being drawn in over and around the top of said baking oven to the inlet opening in said horizontal pipe, whereby a more complete circulation and distribution of air over and around said oven will be obtained, substantially as described.

3. A cooker having an opening in its top and means for closing the same, and a baking oven, a steaming oven arranged above the baking oven and spaced therefrom, said steaming oven having a water tank in its lower portion, and both of said ovens being spaced from the walls of said cooker, a horizontal pipe provided in the space between said ovens and having a centrally arranged intake opening and pipes communicating with the ends of said horizontal pipe and extending vertically in the space between said ovens and the walls of said cooker and having discharge openings through the upper walls of said cooker, and a range having a top provided with air intake openings.

4. In a gas range, the combination, with the outer wall, of a burner provided in the upper portion of said range, a broiling oven arranged below said burner and spaced from the walls of said range, a floor provided within said range and on which said oven is supported, said range having air intake openings in its walls below said floor, and said floor having perforations communicating with said air intake openings and with the space between said range wall and said broiler, the lower walls of said broiler having perforations leading from the interior thereof to the space between said broiler and range wall, whereby a circulation of air will be established through and around said broiler oven, substantially as described.

5. A cooker, having a closable top, a baking oven, a steaming oven arranged above said baking oven, and spaced therefrom, said steaming oven having a water tank in its lower portion and both of said ovens being spaced from the walls of said cooker pipes extending vertically in the space between said oven in the wall of said cooker and having discharge openings through the upper walls of said cooker and a range having a top provided with air intake openings.

6. A cooker, having a closable top, a baking oven, a steaming oven arranged above said baking oven and spaced therefrom, said steaming oven having a water tank in its lower portion, and both of said ovens being spaced from the walls of said cooker, a range having a burner, a coil located above said burner and pipes leading from said coil upwardly into said water tank, substantially as described.

In witness whereof, I have hereunto set my hand this 28th day of December, 1907.

HARRY B. CORNISH.

Witnesses:
  J. B. BYINGTON,
  C. G. HANSON.